Feb. 5, 1924.  
R. R. REID ET AL  
1,482,811  
COMBINED FREEZER AND COOLER  
Filed Dec. 15, 1922  
5 Sheets-Sheet 2
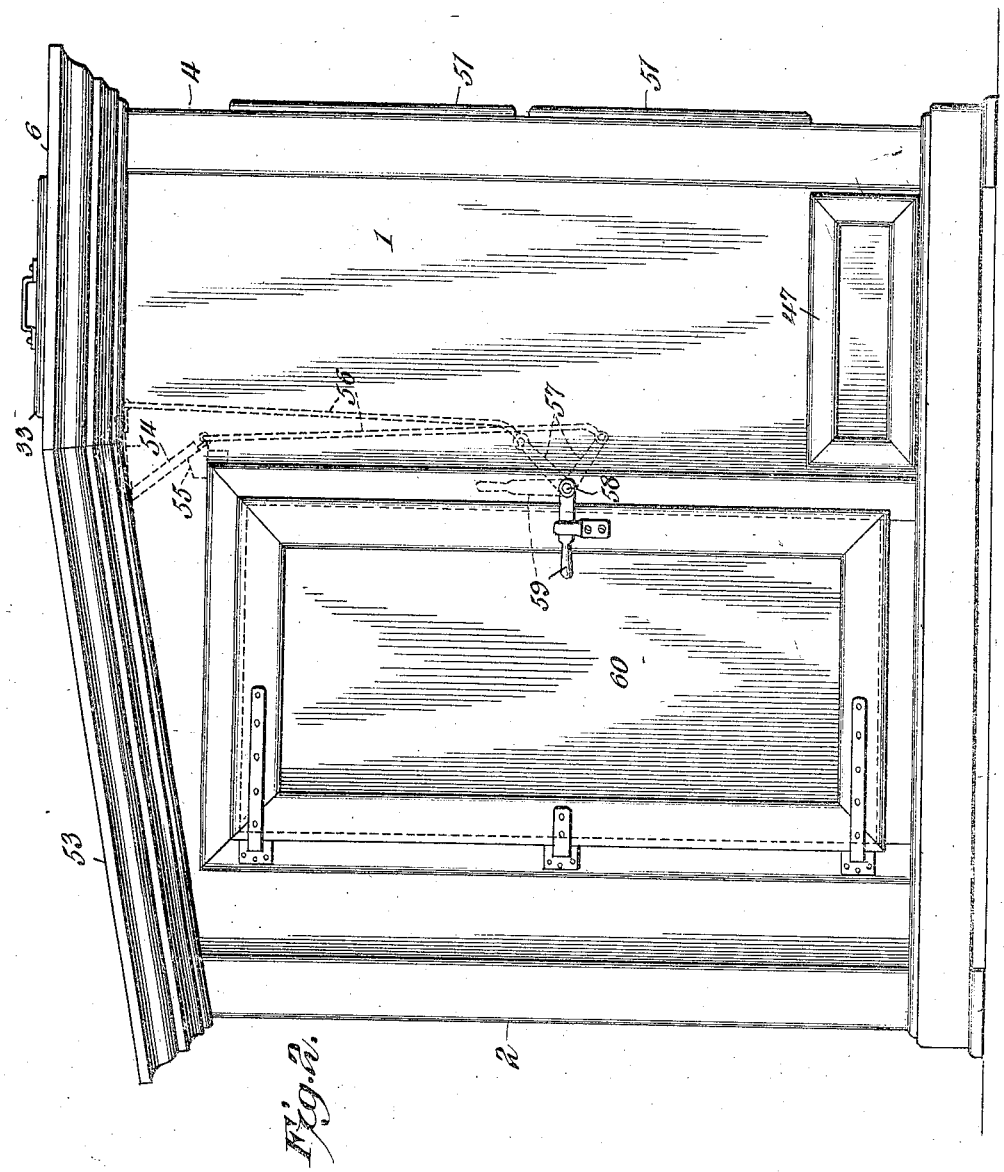
WITNESSES  
Howard D. Orr  
E. N. Lovewell
Remer R. Reid and  
Frederick Neudorff, INVENTORS  
BY  
ATTORNEY

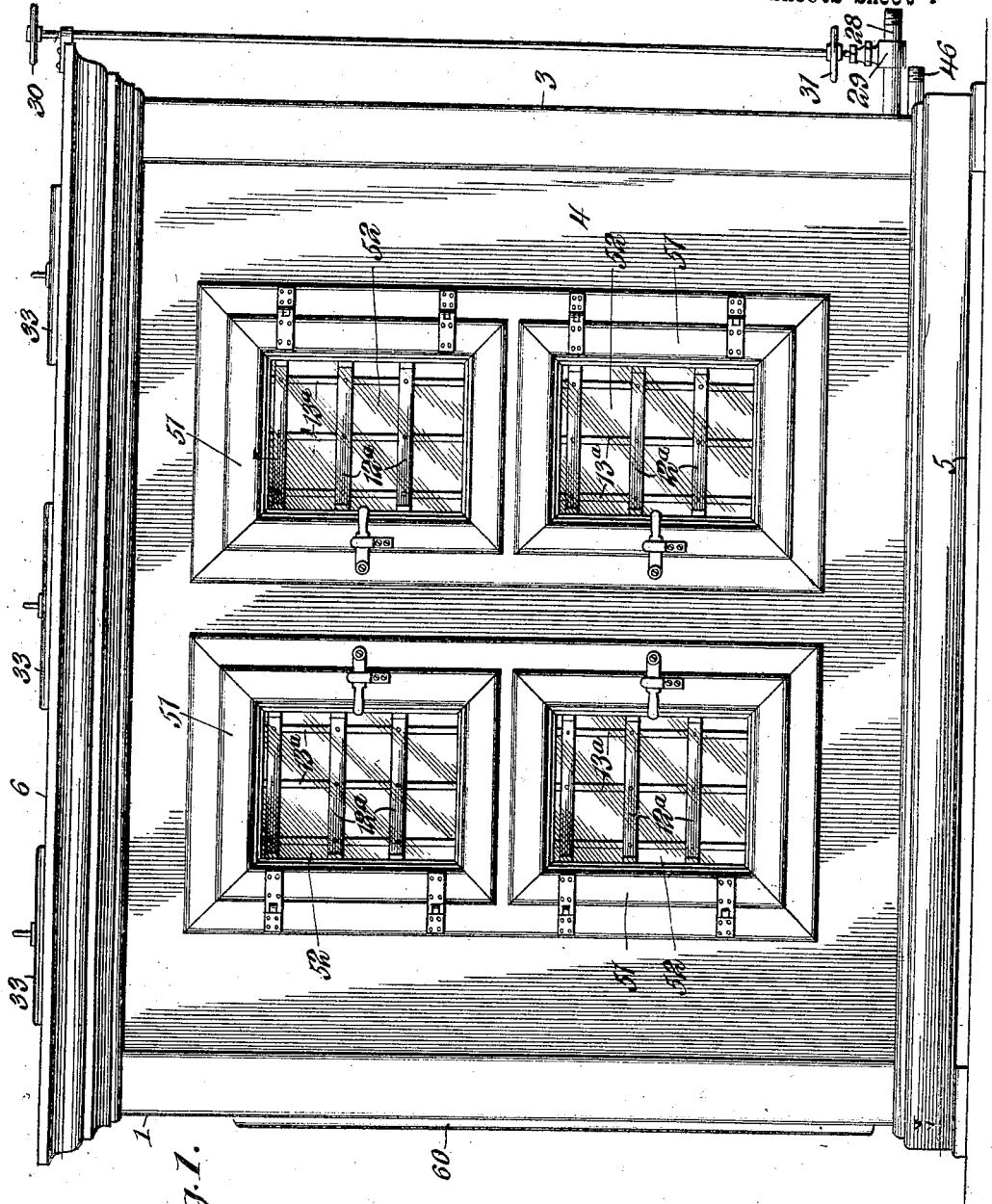

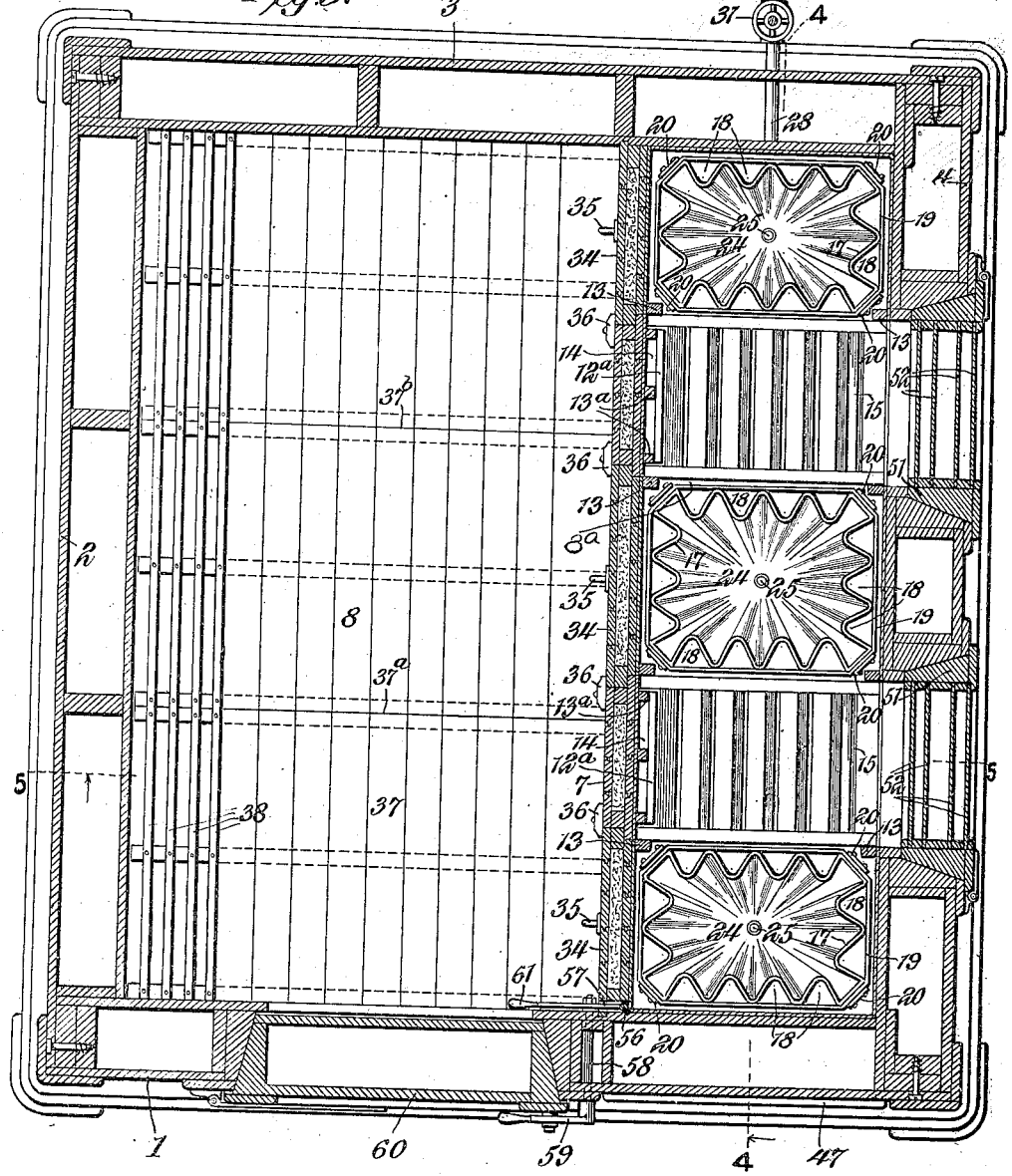

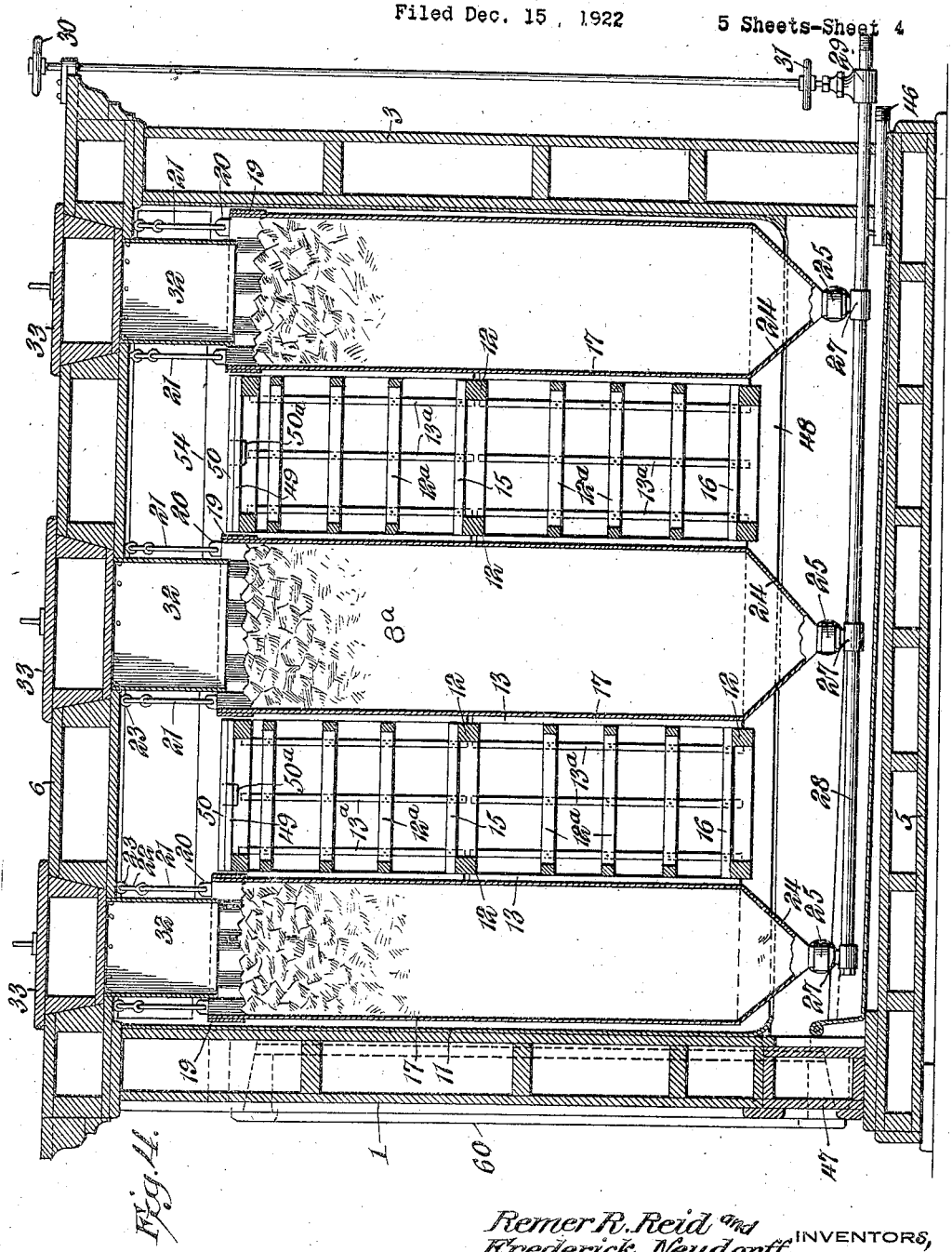

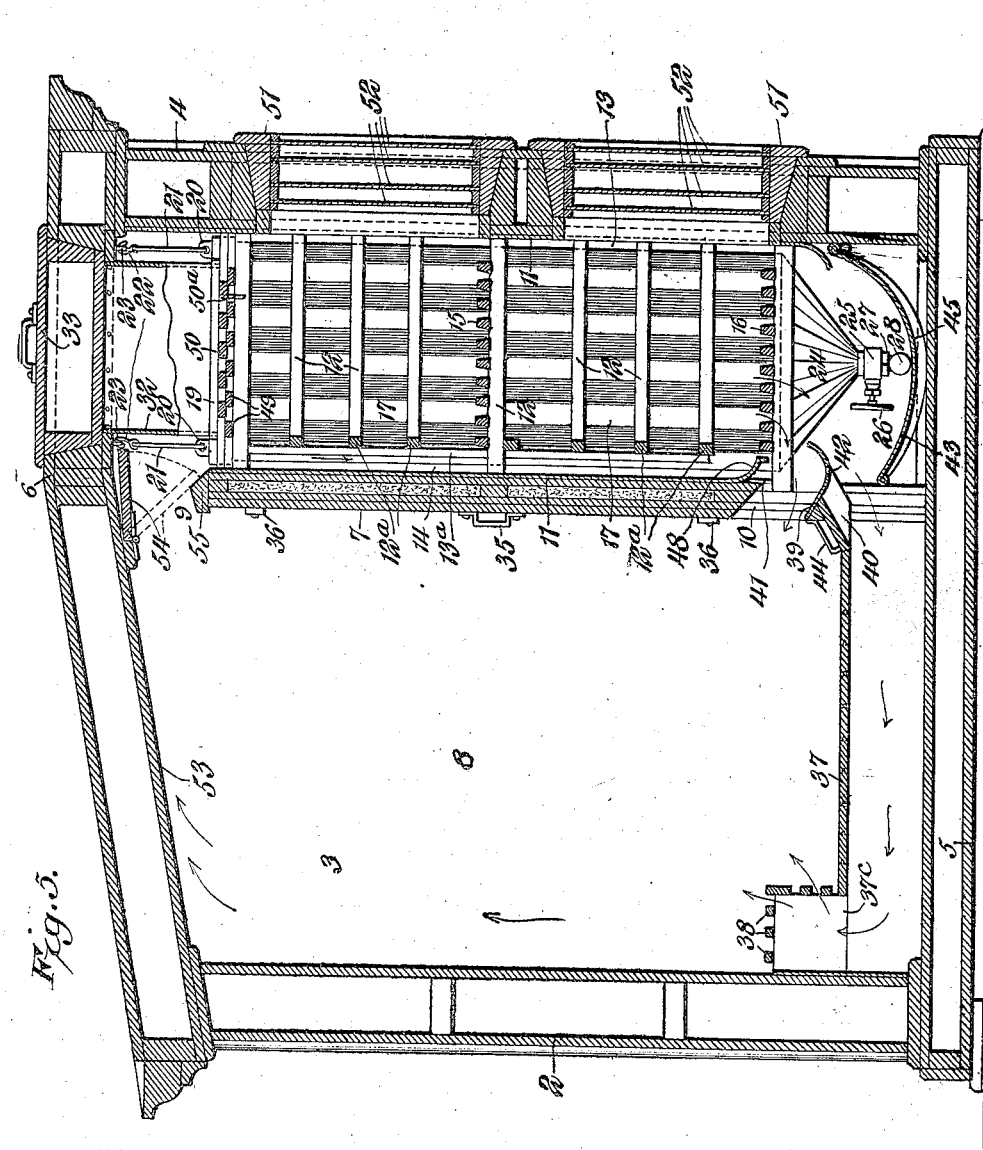

Patented Feb. 5, 1924.

1,482,811

UNITED STATES PATENT OFFICE.

REMER RAIMOND REID AND FREDERICK NEUDORFF, OF ATLANTA, GEORGIA.

COMBINED FREEZER AND COOLER.

Application filed December 15, 1922. Serial No. 607,160.

*To all whom it may concern:*

Be it known that we, REMER R. REID and FREDERICK NEUDORFF, citizens of the United States, residing at Atlanta, in the county of Fulton and State of Georgia, have invented new and useful Improvements in Combined Freezers and Coolers, of which the following is a specification.

Our invention relates to a combined freezer and cooler, which is provided with one or more compartments wherein meat or other provisions may be kept in a frozen condition, and with a larger compartment which is kept sufficiently cool for the preservation of perishable articles which take up considerable space.

The general object of the invention is to provide a device of this character which will be of simple construction, and which will constitute an efficient refrigerating device especially adapted for the trade, and will always maintain perishable food in perfect condition with a minimum consumption of ice.
A more specific object of the invention is the provision of means by which the air is caused to circulate uniformly throughout the device, thus insuring a uniform temperature in all parts of each compartment.
Other features of the invention are the provision of a cooler and freezer supported by an insulating partition, the arrangement of the freezing compartments alternately between tanks containing a cooling medium, the suspension of the tanks, and providing the same with a tapered bottom whereby to prevent salt from packing therein, and to permit the contents to be easily drained, the provision of a false floor for the cooler whereby to provide a double circulation over and under the same for the equalization of the temperature in all parts thereof, a tapered lead or top for the cooler in order to facilitate a circulation of air between the same and the freezing compartments, a closure operable to stop the circulation when the cooler door is opened in order to prevent warm air from entering the freezer, an adjustable ventilator above each of the freezing compartments in order to regulate the air circulation, means whereby all interior parts may be easily removed for the purpose of cleaning, and also various other details which will more fully appear in the following detailed description which is to be read in connection with the accompanying drawings illustrating the preferred form of the invention.

In the drawings:—

Fig. 1 is a front elevation of a refrigerating device embodying our invention.

Fig. 2 is a side elevation thereof.

Fig. 3 is a sectional plan view.

Fig. 4 is a vertical section on the line 4—4
of Fig. 3.

Fig. 5 is a vertical section on the line 5—5
of Fig. 3.

Referring specifically to the drawings, the refrigerating device comprises side insulating walls 1, 2, 3 and 4, a bottom wall or floor 5, and a top wall 6, all constructed and arranged in a manner well understood by those familiar with refrigerator construction.

Extending from side to side between the walls 1 and 3 is an insulating partition 7, on one side of which is a cooler 8 of comparatively large capacity and adapted to contain provisions which need to be kept at a low temperature but not frozen. The partition 7 is spaced from the top and bottom walls, as shown at 9 and 10, to provide for the free circulation of air between the cooler 8 and the compartments on the other side of the partition, which, as will be more fully explained hereinafter, include a number of freezing compartments 8ª with tanks 17 arranged on each side thereof or alternately therewith and adapted to contain a cooling medium. The walls and partition on the side which contains the cooling tanks and freezing compartments are lined with a non-corrodible metallic sheeting 11. The freezing compartments are separated from the tank compartments by openwork partitions consisting of horizontal bars 12 supported by corner posts or studs 13. The freezing compartments are also provided at their rear sides adjacent the partitions 7 with horizontal slats 12ª supported by vertical strips 13ª, in order to provide spaces or flues 14 to permit free circulation of air, although the compartment is filled with provisions. A suitable number of horizontal and vertical strips are also arranged between the freezing compartments and the tanks in order to form a suitable receptacle and at the same time allow for free circulation of air and the proper refrigeration of the meats and other provisions contained therein. Horizontal gratings 15 and 16 are also provided for supporting such articles as may be desired.

Between and on each side of the freezing compartments, we arrange the tanks 17 adapted to contain a cooling medium such as cracked ice and salt, and the walls of these tanks are fluted to form flues 18 by means of which a maximum amount of air may come in contact with the cold surface of the tanks. The shape of the tank walls is an improvement on the ordinary construction by reason of the fact that the grooves are made in the shape of a V with flat sides having the vertexes comparatively sharp and spaced widely apart so that as frost or ice is formed on the sides of the flues, it will still leave a considerable passageway through which air may circulate and the ice may also be easily removed. Each of the tanks is provided at its upper end with a band 19 which forms a rim to hold the tank in the proper shape and has secured at each corner an ear 20 to which is connected a link 21 and hook 22, by means of which the tank is supported from eyes 23 secured to the top wall 6. The lower end of the tank has downwardly tapered sides 24 that converge to form a central outlet which is controlled preferably by a gate valve 25 operable by means of a valve wheel 26. The valve-controlled outlet is connected by a union 27, of any conventional form, to a drain pipe 28. The drain pipe, as will be understood, has an independent valve connection for each tank, and outside of the refrigerating device may be provided with a valve 29, preferably provided with upper and lower control wheels 30 and 31, as shown in Fig. 4. Each tank is provided with a square feed chute 32 which extends from the top of the tank to the top wall 6 of the refrigerating device and is there provided with a removable cover 33 whereby the cooling mixture of ice and salt may be readily fed into the tank without coming in contact with the contents of the freezing chambers. It is to be understood that the valves 25 are kept normally closed in order that the melted ice, which will be at a temperature below freezing, may be retained and its cooling effect utilized rather than permitting it to escape into the outside atmosphere.

The partition 7 is provided opposite each tank 17 with a removable section 34 which is provided with a suitable handle 35, suitable buttons or latches 36 being provided to normally retain the sections in place. Thus, any one of the tanks 17 may be easily removed for cleaning purposes.

The cooler 8 is provided with a false floor 37, which is preferably made up of removable sections, the lines of division between the sections being indicated at 37ª and 37ᵇ in Fig. 3. At the rear side of the cooler 8, the false floor 37 is open, as at 37ᶜ, and above said opening is a lattice work 38 forming a shelf upon which articles may be laid which will thereby receive the full effect of the cold air which passes from the freezer underneath the false floor 37 and up through the cracks between the lattice work 38 in accordance with the circulatory system which will be more fully explained hereinafter.

A deflector 39 extends underneath the partition 7, which serves to deflect a portion of the air currents above the false floor 37 while the remaining portion passes beneath the deflector and the false floor. The air, as it circulates past the cooling tanks through the flues 18, will be deprived of a portion of its humidity, which will be precipitated upon the surface of the tank in the form of frost or ice, which, at times, will melt. The inner lining 11 of each of the tank compartments is extended straight downwardly, as shown at 41 in Fig. 5, so as not to obstruct the free circulation of the air, and the moisture which drips therefrom and from the sides of the tank will drop onto the deflector 39 which is in the shape of a trough having perforations 42 at its lowest point through which the moisture will drop into a drip pan 43 which extends from side to side of the refrigerating device underneath the tanks and freezing compartments. The deflector is removably supported by brackets 40, and is provided with handles 44, by means of which it may be removed, thus providing easy access to the valve wheels 26. The drip pan 43 is provided with an inclined bottom 45 and has an outlet 46 through which the drippings may be discharged outside of the refrigerator. A removable door 47 is also provided at one side of the freezer, through which the drip pan may be removed for the purpose of cleaning the same.

The lining 11 opposite the freezers is provided with an inwardly-extending lower end 48, as shown in Fig. 5, in order that the currents of air passing downwardly may come in contact with articles in the lower part of the compartment. The air thus deflected also passes beneath the deflector 39 and underneath the false floor 37. Each freezing compartment is also provided with a lattice work 49 at its upper end, the openings through which may be adjusted by means of a slotted slide 50 which may be adjusted from inside the compartment by means of a handle 50ª. Each of the freezing compartments is preferably provided with two doors 51 so that either the upper or lower portion may be opened without opening the other portion, each door being provided with a plurality of spaced windows 52.

It will be readily understood that as the air becomes chilled by its contact with the cooling tanks, it will become denser and have a tendency to flow downwardly, and this will set up a circulation downwardly through the freezing compartment and on either side of the false floor 37, thus providing an equal temperature on all sides of the cooler. The circulation of air is also facilitated by the inclined upper surface 53 of the cooler, which leads the air upwardly and inwardly toward the opening 9 above the partition and back into the freezer. The opening 9 is opened or closed by means of a pivoted gate 54, which, when closed, rests against a cap piece 55 that extends from end to end of the cooler and also serves to make the partition 7 rigid. The opening and closing of the gate 54 is controlled through a link 56 which is pivotally connected at one end to the gate, as shown in dotted lines in Fig. 2, and is connected at its lower end with an arm 57 secured to a rock shaft 58. This rock shaft extends through the wall of the cooler and is provided outside thereof with a laterally-extending handle 59 which serves also as a latch for the door 60 which provides access to the cooler. The shaft 58 may also be provided with a handle 61 inside the cooler. By means of this simple arrangement, it will be seen that whenever the latch 59 is raised to the position shown in dotted lines in Fig. 2, in order to open the door 60, the gate 54 will be closed before the door 60 can be opened, thus stopping the circulation of air through the freezer and preventing the same from becoming warmed.

By means of the construction herein described, we have provided a simple and economical refrigerating device which will answer all needs of the usual provision dealer. The arrangement of the freezing compartments between the tanks makes it possible to carry a freezing temperature at all times in these compartments, whereby the most perishable foods may be kept frozen as long as desired. At the same time, a large capacity is provided in the cooler where a uniform temperature close to freezing may be kept, and by means of our special construction, which causes a complete circulation of air and prevents to the greatest extent the intermingling of the low temperatures of the freezer with the outside temperature, the greatest economy of ice is effected.

While we have shown and described the details of construction, showing one way in which the principles of our invention may be embodied, it is to be understood that this is merely illustrative, and that many of these features may be modified or omitted altogether without departing from the fundamental principles of the invention as defined in the appended claims.

What I claim is: —

1. A refrigerating device having top, bottom and side insulating walls, a freezing compartment therein having top, bottom and side walls spaced from the first-mentioned walls and each formed of slatted openwork to permit free circulation of air through and around the compartment, and tanks on opposite sides of said compartment for containing a cooling medium.

2. A refrigerating device having top, bottom and side insulating walls, a freezing compartment therein having top, bottom and side walls spaced from the first-mentioned walls and each formed of slatted openwork to permit free circulation of air through and around the compartment, tanks suspended on opposite sides of the compartment, a chute connecting each tank with the top of the device and having a removable cover to permit the cooling medium to be introduced without opening or disturbing the freezing compartment, and a drain having an individual valved connection with the bottom of each tank.

3. A combined freezer and cooler having top, bottom and side insulating walls, an insulating partition extending from side to side thereof, freezing compartments and tanks for containing cooling medium, arranged alternately on one side of the partition, and having vertical flues therebetween, and the partition having spaces at the top and bottom to permit free circulation of air through the flues and through the cooling compartment on the opposite side of the partition.

4. A combined freezer and cooler having top, bottom and side insulating walls, an insulating partition extending from side to side thereof to provide a cooler on one side, the space on the other side of the partition being divided to form a plurality of freezing compartments and having tanks between and on each side of the freezing compartments to contain a cooling medium, a portion of the partition being spaced from the top and bottom walls to permit free circulation of air between the freezing and cooling compartments, the top wall of the cooling compartment being arranged to slope upwardly toward the freezing compartment to facilitate the circulation of the air.

5. A combined freezer and cooler having top, bottom and side insulating walls, an insulating partition extending from side to side thereof to provide a cooler on one side, the space on the other side of the partition being divided into freezing compartments and having tanks arranged alternately with the freezing compartments for containing a cooling medium, a portion of the partition being spaced from the top and bottom walls to provide free circulation between the freezing compartments and the cooler, said freezing compartments having openings to permit the circulation of air therethrough, and means for adjusting the area of said openings.

6. A combined freezer and cooler having top, bottom and side insulating walls, an insulating partition extending from side to side thereof, a portion of the partition being spaced from the top and bottom walls, a cooling compartment on one side of the partition, the space on the other side of the partition having freezing compartments and tanks adapted to contain a cooling medium, arranged alternately, the walls of the tanks being fluted to provide flues, whereby circulation of air is established between the compartments on opposite sides of the partition and through said flues, the cooling compartment being provided with a false floor, and means for dividing the cooled air as it passes downwardly through the flues and directing it partly above and partly below said false floor.

7. A combined freezer and cooler having top, bottom and side insulating walls, an insulating partition extending from side to side thereof, portions thereof being spaced from the top and bottom walls, a cooling compartment on one side of the partition, the space on the other side of the partition having freezing compartments and tanks adapted to contain a cooling medium, arranged alternately, the walls of the tanks being fluted to provide flues, and the freezing compartment being provided with openings whereby free circulation of air takes place through and between various compartments.

8. A combined freezer and cooler having top, bottom and side insulating walls, an insulating partition extending from side to side thereof, freezing compartments and tanks for containing cooling medium arranged alternately on one side of the partition, the space on the other side of the partition forming a cooler, the walls of the tanks being fluted to provide flues, and the freezing compartment being provided with openings whereby to permit a free circulation of air therethrough, a portion of the partition being spaced from the top and bottom walls to provide circulation between the compartments on opposite sides thereof, the cooling compartment being provided with a false floor, and means for dividing the cooled air as it passes downwardly through the freezing compartment and directing it partly above and partly below said false floor.

9. A combined freezer and cooler having top, bottom and side insulating walls, an insulating partition extending from side to side thereof to provide a cooling compartment on one side of the partition, the space on the other side of the partition having freezing compartments and tanks adapted to contain a cooling medium, arranged alternately, the walls of the tanks being fluted to provide flues, a portion of the partition being spaced from the top and bottom walls, the spaces thus formed being in communication with said flues to permit free circulation of air between the cooling compartment and said flues, a door providing access to the cooling compartment, and means connected with the door and operated by the opening thereof to close one of the spaces through the partition to stop the circulation of air between the cooling compartment and said flues.

10. A refrigerating device having top, bottom and side insulating walls, freezing compartments and tanks for containing a cooling medium, arranged alternately within said walls, and having passageways therebetween for air circulation, a drip pan within the device underneath the passageways for collecting moisture which condenses on the sides of the passageways, and a door through which the drip pan is removable.

11. A combined freezer and cooler having top, bottom and side insulating walls, an insulating partition extending from side to side thereof to provide a cooler on one side, the space on the other side of the partition having freezing compartments and tanks for containing a cooling medium, arranged alternately, and provided with flues, a portion of the partition being spaced from the top and bottom walls to provide air circulation through and between the flues and the cooler, a drip pan beneath the flues, and an air deflector between the flues and drip pan, said deflector having sloping sides and an outlet for discharging condensed moisture into the drip pan.

12. A combined freezer and cooler having top, bottom and side insulating walls, an insulating partition extending from side to side thereof to provide a cooler on one side, the space on the other side of the partition having freezing compartments and tanks for containing a cooling medium, arranged alternately, and provided with flues, a portion of the partition being spaced from the top and bottom walls to provide air circulation through and between the flues and the cooler, a false floor in the cooler spaced from the bottom wall and having openings adjacent the outer wall, and an air deflector beneath the flues adjacent to the partition for directing a portion of the circulating air from the flues above the false floor of the cooler while the remainder of the circulating air passes beneath said floor.

13. A combined freezer and cooler having top, bottom and side insulating walls, an insulating partition extending from side to side thereof to provide a cooler on one side, the space on the other side of the partition having freezing compartments and tanks for containing a cooling medium, arranged alternately, said partition being provided with removable sections through which the tanks may be removed.

14. A combined freezer and cooler having top, bottom and side insulating walls, an insulating partition extending from side to side thereof to provide a cooler on one side, the space on the other side of the partition having freezing compartments and tanks for containing a cooling medium, arranged alternately, said tanks being suspended from the top wall and each having a tapered bottom, and a drain having an individual valved connection with each tank bottom and said partition being provided with removable sections through which the tanks may be removed.

15. A combined freezer and cooler having top, bottom and side insulating walls, an insulating partition extending from side to side thereof to provide a cooler on one side, the space on the other side of the partition having freezing compartments and tanks for containing a cooling medium, arranged alternately, and provided with flues, a portion of the partition being spaced from the top and bottom walls to provide air circulation through and between the flues and cooler, said tanks being suspended from the top wall and each having a tapered bottom, a drain having inside the bottom wall an individual valved connection with each tank bottom, a false floor in the cooler spaced from the bottom wall and having openings adjacent the outer wall, and an air deflector beneath the flues adjacent the partition for directing a portion of the circulating air from the flues above the false floor of the cooler while the remainder of the circulating air passes beneath said floor, said deflectors being removable to provide access to the drainage valves.

16. A combined freezer and cooler having top, bottom and side insulating walls, an insulating partition extending from side to side thereof, freezing compartments and tanks for containing a cooling medium, arranged alternately on one side of the partition, said tanks being suspended from the top walls and having V-shaped vertical grooves in their sides to form air flues, the bottoms of said tanks being in the shape of inverted pyramids, and drainage means having individual valved connections with the apices of the bottoms.

17. A combined freezer and cooler having top, bottom and side insulating walls, an insulating partition extending from side to side thereof, freezing compartments and tanks for containing a cooling medium, arranged alternately on one side of the partition, said tanks being suspended from the top walls and having V-shaped vertical grooves in their sides to form air flues, a portion of said partition being spaced from the top and bottom walls to provide air circulation, a hinged gate for closing the space between the partition and upper wall, a door opening into the cooler, and means operable by the opening and closing of said door to respectively close and open said gate.

18. A combined freezer and cooler having top, bottom and side insulating walls, an insulating partition extending from side to side thereof, freezing compartments and tanks for containing a cooling medium, arranged alternately on one side of the partition, said tanks being suspended from the top walls and having V-shaped vertical grooves in their sides to form air flues, the bottoms of said tanks being in the shape of inverted pyramids, drainage means having individual valved connections with the apices of the bottoms, a portion of said partition being spaced from the top and bottom walls to provide air circulation, and an air deflector beneath the partition to promote the circulation of air, said deflector being removable to permit access to the drainage valves.

19. A combined freezer and cooler having top, bottom and side insulating walls, an insulating partition extending from side to side thereof, freezing compartments and tanks for containing a cooling medium, arranged alternately on one side of the partition, and having vertical passageways, a portion of said partition being spaced from the top to provide communication between the cooler and said passageways, said cooler having a false bottom, the space underneath the false bottom being in communication with said passageways, and a shelf on the outer side of the cooler having openings in communication with the space beneath the false floor, whereby provisions placed on said shelf will be subjected to a continuous current of cold air.

In testimony, that we claim the foregoing as our own, we have hereto affixed our signatures.

REMER RAIMOND REID.
FREDERICK NEUDORFF.